(12) United States Patent
Kokubo

(10) Patent No.: US 12,415,274 B2
(45) Date of Patent: Sep. 16, 2025

(54) ROBOT SYSTEM, CONTROL DEVICE, DIAGNOSIS METHOD, AND DIAGNOSIS PROGRAM

(71) Applicant: FANUC CORPORATION, Yamanashi (JP)

(72) Inventor: Kyouhei Kokubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 108 days.

(21) Appl. No.: 18/561,397

(22) PCT Filed: Aug. 3, 2021

(86) PCT No.: PCT/JP2021/028761
§ 371 (c)(1),
(2) Date: Nov. 16, 2023

(87) PCT Pub. No.: WO2023/012894
PCT Pub. Date: Feb. 9, 2023

(65) Prior Publication Data
US 2024/0238976 A1    Jul. 18, 2024

(51) Int. Cl.
*B25J 9/16*    (2006.01)
(52) U.S. Cl.
CPC .......... *B25J 9/1674* (2013.01); *B25J 9/1697* (2013.01)
(58) Field of Classification Search
CPC . B25J 19/023; B25J 9/16; B25J 9/1674; B25J 9/1697; G05B 2219/40584; G05B 2219/40613

USPC .................................................. 700/245–264
See application file for complete search history.

(56) References Cited

U.S. PATENT DOCUMENTS

| | | | |
|---|---|---|---|
| 10,867,396 B1* | 12/2020 | Li | B25J 9/1697 |
| 12,036,663 B2* | 7/2024 | Stenbacka | G06T 7/73 |
| 2011/0004343 A1* | 1/2011 | Iida | B25J 9/10 901/47 |
| 2014/0074292 A1* | 3/2014 | Sawada | G05D 1/00 700/259 |
| 2017/0095930 A1* | 4/2017 | Warashina | B25J 9/1697 |
| 2018/0126553 A1* | 5/2018 | Corkum | B25J 9/1697 |

(Continued)

FOREIGN PATENT DOCUMENTS

| | | | | |
|---|---|---|---|---|
| CA | 2912589 C | * | 6/2021 | B25J 19/022 |
| JP | S64-002891 A | | 1/1989 | |
| JP | H01-193902 A | | 8/1989 | |

(Continued)

*Primary Examiner* — Jonathan L Sample
(74) *Attorney, Agent, or Firm* — Maier and Maier, PLLC

(57) ABSTRACT

A robot system including: a robot with one or more movable elements respectively rotatable about one or more rotation axes; a control device that controls the robot; and a visual sensor attached to any of the movable elements of the robot, where the control device uses any of the movable elements of the robot as a subject element, compares a position of a predetermined target in a first image at an arbitrary first orientation of the robot at which the target fixed at a predetermined position is disposed inside a field of view of the visual sensor, and the position of the predetermined target in a second image at a second orientation at which the subject element is rotated about a rotation axis of the subject element with respect to the first orientation, and determines that the visual sensor is attached to the subject element.

10 Claims, 8 Drawing Sheets

(56) References Cited

U.S. PATENT DOCUMENTS

2022/0055226 A1\*  2/2022  Kitagawa ............... B25J 9/1697

FOREIGN PATENT DOCUMENTS

| | | |
|---|---|---|
| JP | H04-313106 A | 11/1992 |
| JP | 2005-131761 A | 5/2005 |
| JP | 2005-138223 A | 6/2005 |
| JP | 2005-149299 A | 6/2005 |
| JP | 2015-160264 A | 9/2015 |
| JP | 2016-221615 A | 12/2016 |
| JP | 2020-108909 A | 7/2020 |
| WO | WO-2021022049 A1 \* 2/2021 ....... H01L 21/67184 |

\* cited by examiner

ROBOT SYSTEM, CONTROL DEVICE, DIAGNOSIS METHOD, AND DIAGNOSIS PROGRAM

TECHNICAL FIELD

The present disclosure relates to a robot system, a control device, a diagnosis method, and a diagnosis program.

BACKGROUND

There is a known system in which a camera for acquiring position information of a workpiece or the like is attached to the distal end of a wrist of a robot, and an operation program is executed to cause the robot to perform work while photographing the workpiece or the like (for example, see Japanese Unexamined Patent Application, Publication No. Hei 1-193902).

SUMMARY

An aspect of the present disclosure is a robot system including: a robot provided with one or more movable elements that are respectively rotatable about one or more rotation axes; a control device that controls the robot; and a visual sensor attached to any of the movable elements of the robot, wherein the control device uses any of the movable elements of the robot as a subject element, compares a position of a predetermined target in a first image acquired by the visual sensor at an arbitrary first orientation of the robot at which the target fixed at a predetermined position is disposed inside a field of view of the visual sensor, and the position of the target in a second image acquired by the visual sensor at a second orientation at which the subject element is rotated about a rotation axis of the subject element with respect to the first orientation, and determines that the visual sensor is attached to the subject element when the position of the target in the first image and the position of the target in the second image are different.

DETAILED DESCRIPTION OF EMBODIMENTS

A robot system 1, a control device 30, a diagnosis method, and a diagnosis program according to a first embodiment of the present disclosure will be described below with reference to the drawings.

Figure 1:
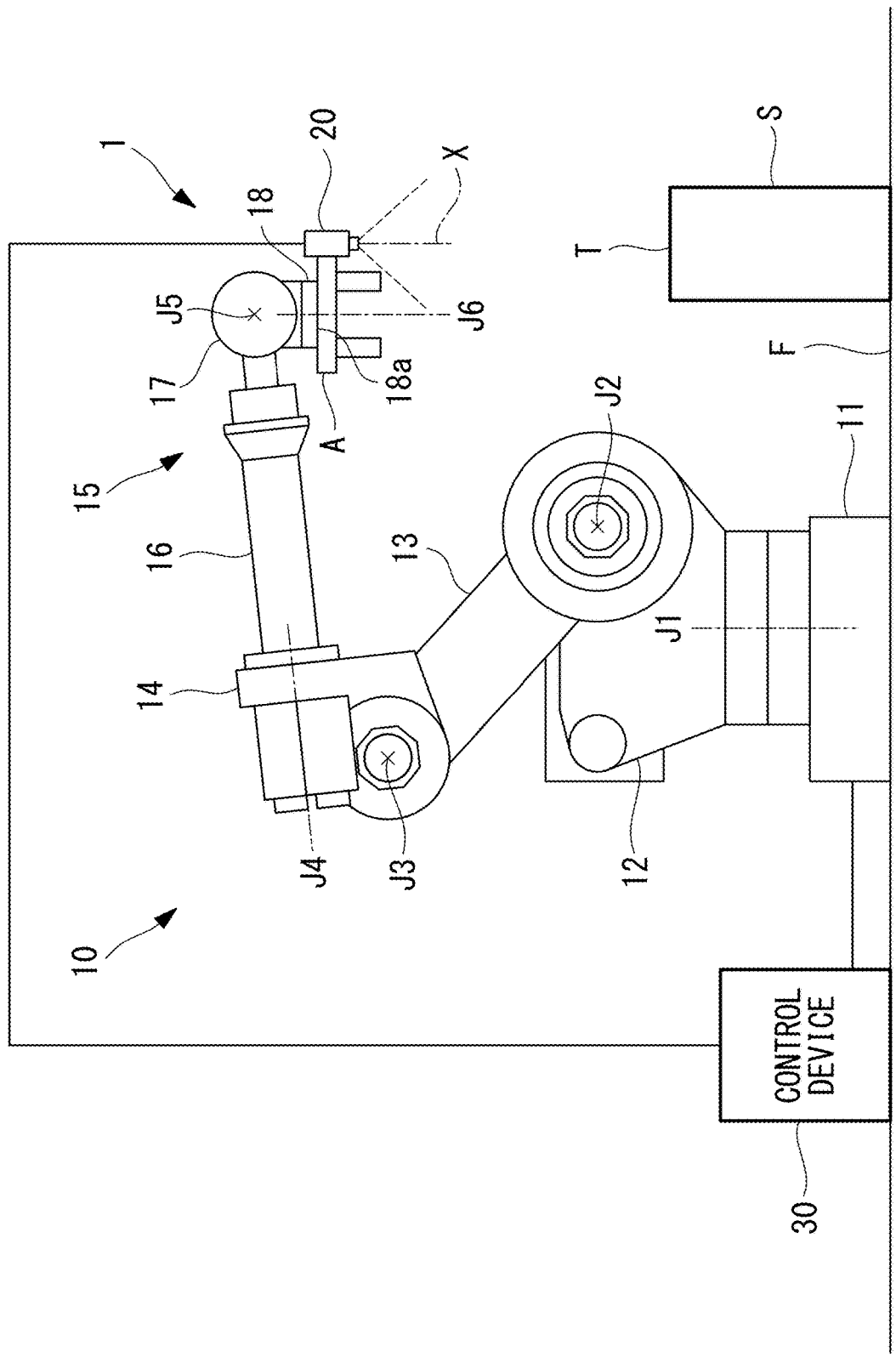
FIG. 1 is an overall configuration diagram showing a robot system according to a first embodiment of the present disclosure.

The robot system 1 according to this embodiment includes, for example, as shown in FIG. 1, a robot 10 that performs prescribed work, a camera (visual sensor) 20 that is attached to the robot 10, and a control device 30 that controls the robot 10 and the camera 20.

The robot 10 includes, for example, as shown in FIG. 1, a base 11 that is installed on a horizontal floor F, and a revolving drum (movable element) 12 that is supported so as to be rotatable about a vertical first axis J1 with respect to the base 11. In addition, the robot 10 includes a first arm (movable element) 13 that is supported so as to be rotatable about a horizontal second axis J2 with respect to the revolving drum 12, and a second arm (movable element, robot arm) 14 that is supported so as to be rotatable about a horizontal third axis J3 with respect to the distal end of the first arm 13. Furthermore, the robot 10 is provided with a three-axis wrist unit 15 that is supported at the distal end of the second arm 14.

The wrist unit 15 includes a first wrist element (movable element) 16 that is supported so as to be rotatable about a fourth axis J4, which extends along a plane orthogonal to the third axis J3, with respect to the second arm 14. In addition, the wrist unit 15 includes a second wrist element (movable element) 17 that is supported so as to be rotatable about a fifth axis J5 orthogonal to the fourth axis J4 with respect to the first wrist element 16. Furthermore, the wrist unit 15 includes a third wrist element (movable element, wrist element) 18 that is supported so as to be rotatable about a sixth axis (rotation axis) J6, which is orthogonal to the fifth axis J5 and passes through an intersection of the fourth axis J4 and the fifth axis J5, with respect to the second wrist element 17.

The camera 20 is, for example, a two-dimensional camera or a three-dimensional camera, and in an example shown in FIG. 1, the camera 20 is fixed to a tool A, such as a hand, fixed to a flange surface 18a of the third wrist element 18. With this configuration, the camera 20 is indirectly fixed to the third wrist element 18 via the tool A. In addition, the camera 20 has an optical axis X thereof arranged parallel to the sixth axis J6 and has a field of view in a direction opposite to the flange surface 18a (forward direction).

Figure 2:
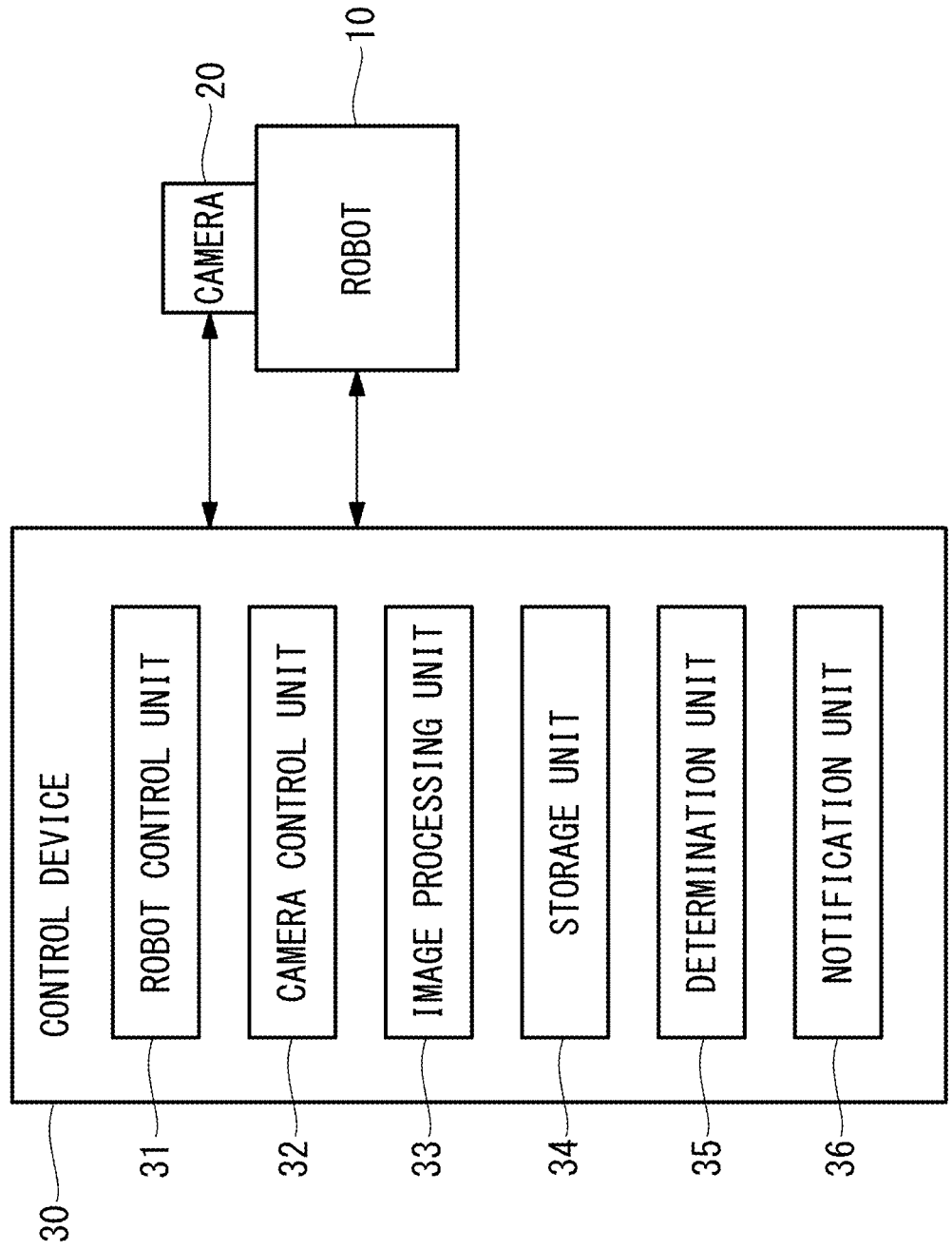
FIG. 2 is a block diagram showing the configuration of the robot system in FIG. 1.

The control device 30 includes at least one processor and at least one memory. As shown in FIG. 2, the control device 30 includes: a robot control unit 31 that controls the robot 10; a camera control unit 32 that controls the camera 20; and an image processing unit 33 that processes an image acquired by the camera 20. In addition, the control device 30 includes a storage unit 34 that stores a diagnosis program etc., a determination unit 35, and a notification unit 36.

The diagnosis program causes the robot 10 to sequentially operate in a first orientation to a fourth orientation that have been set, and actuates the camera 20 to acquire images in each of the orientations. The diagnosis program may be included in a leading portion of an operation program as part of the operation program for performing work using the camera 20, or may be executed independently of the operation program.

The first orientation is, for example, as shown in FIG. 1, an orientation of the robot 10 in which the camera 20 is disposed, facing downward, above a target T provided on a top surface of a table S fixed to the floor F, and the target T is disposed inside the field of view of the camera 20.

The first orientation is set, for example, by means of a teaching operation in which an operator operates the robot 10 while viewing the image acquired by the camera 20.

Figure 3:
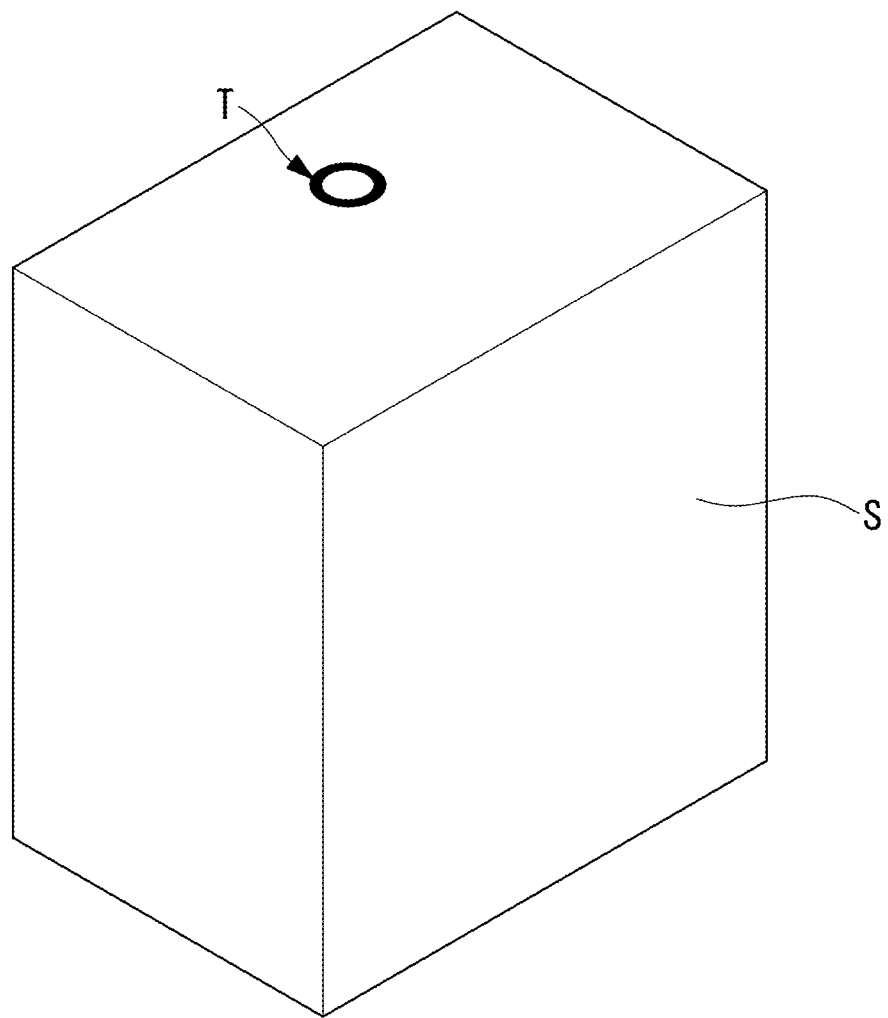
FIG. 3 is a diagram showing a target set in the robot system in FIG. 1.

The target T may be, for example, as shown in FIG. 3, a circular mark drawn on the top surface of the table S. With the circular mark, it is possible to easily detect the center position thereof by means of image processing. In addition, the target T may have any shape other than a circle, and besides a mark, it is permissible to employ, for example, a portion of a structure, such as a corner of the table S, that has a characteristic shape and the position of which can be easily detected.

A second orientation is an orientation of the robot 10 in which only the third wrist element 18 is rotated about the sixth axis J6 with respect to the first orientation, by a minute angle to the extent that the target T does not deviate from the field of view of the camera 20. Here, the minute angle may be an angle at which it is possible to detect a movement of the target T between two images acquired by the camera 20, for example, an angle at which the movement amount corresponds to at least several pixels when the target T has moved.

A third orientation is an orientation of the robot 10 in which the third wrist element 18 and the camera 20, in a state in which the robot 10 is in the second orientation, are moved by a minute distance in a direction intersecting the sixth axis J6. In this orientation also, the target T is disposed inside the field of view of the camera 20. Here, the minute distance may also be a distance at which it is possible to detect a movement of the target T between two images acquired by the camera 20, for example, a distance at which the movement amount corresponds to at least several pixels when the target T has moved.

In addition, the fourth orientation is an orientation of the robot 10 in which only the third wrist element 18 is rotated about the sixth axis J6 with respect to the third orientation, by a minute angle to the extent that the target T does not deviate from the field of view of the camera 20. The minute angle in this case may be the same as the minute angle in the second orientation with respect to the first orientation.

As with the first orientation, the second orientation, the third orientation, and the fourth orientation are all determined by the operator and stored as teaching points of the diagnosis program in advance.

When the diagnosis program is executed and the robot 10 is set in any one of the first orientation to the fourth orientation, the camera 20 is activated by means of a command signal output from the camera control unit 32, and acquires an image of an imaging subject included in the field of view in each of the orientations. The camera 20 transmits the acquired image to the image processing unit 33 of the control device 30.

The image processing unit 33 processes the image transmitted from the camera 20, detects the target T included in the image, and, for example, in an XY coordinate system defined with reference to one end of the image, extracts the coordinates of the center position of the target T. The extracted coordinates of the center position of the target T are stored in the storage unit 34 together with the orientation information of the robot 10.

In a state in which the coordinates C1 of the center position of the target T corresponding to the first orientation and the coordinates C2 of the center position of the target T corresponding to the second orientation are stored in the storage unit 34, the determination unit 35 reads out these coordinates from the storage unit 34 and calculates a displacement amount (movement amount) D1 between the two coordinates. In the case in which the displacement amount D1 is larger than a prescribed threshold, the determination unit 35 determines that the camera 20 is a hand camera fixed to the third wrist element 18.

Meanwhile, in the case in which the displacement amount D1 calculated by the determination unit 35 is equal to or less than the prescribed threshold, the coordinates C3 of the center position of the target T corresponding to the third orientation and the coordinates C4 of the center position of the target T corresponding to the fourth orientation are extracted and stored in the storage unit 34. Subsequently, the two coordinates are read out from the storage unit 34, and a displacement amount (movement amount) D2 between the two coordinates is calculated.

In the case in which the displacement amount D2 is larger than the prescribed threshold, the determination unit 35 determines that the camera 20 is a hand camera fixed to the third wrist element 18. Meanwhile, in the case in which the displacement amount D2 is equal to or less than the prescribed threshold, it is determined that the camera 20 is not fixed to the third wrist element 18, in other words, is not a hand camera.

The notification unit 36 is, for example, a monitor, a speaker, an indicator lamp, etc., and notifies an external operator or the like of the result of determination as to whether the camera 20 is a hand camera, which is performed by the determination unit 35.

A diagnosis method performed by the control device 30 of the thus-configured robot system 1 according to this embodiment will be described below.

First, the control device 30 of the robot system 1 according to this embodiment executes a diagnosis program before executing an operation program for causing the robot 10, in which the camera 20 is fixed to the third wrist element 18, to perform prescribed work.

Figure 4:
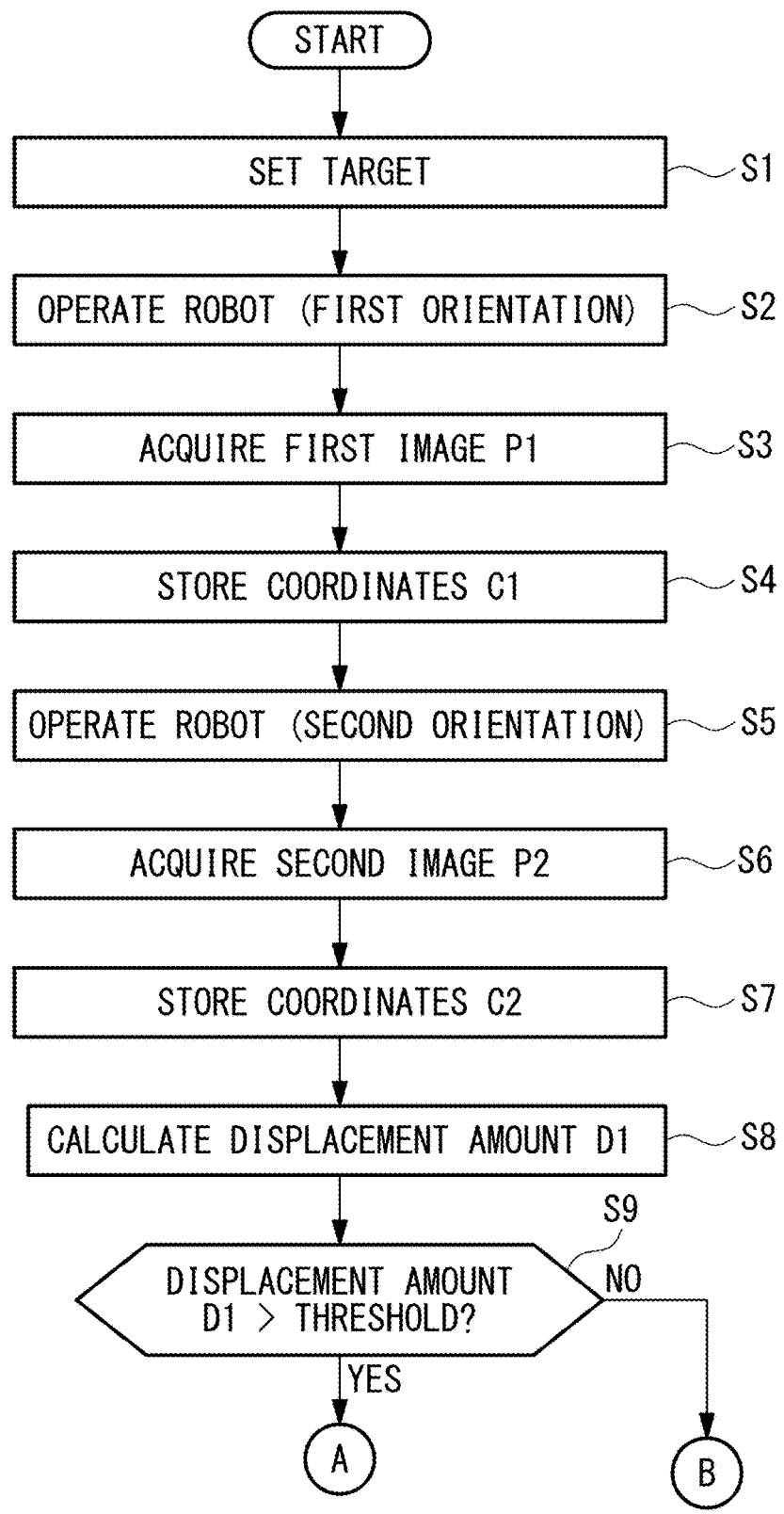
FIG. 4 is a first half of a flowchart showing a method of controlling the robot system in FIG. 1.
Figure 5:
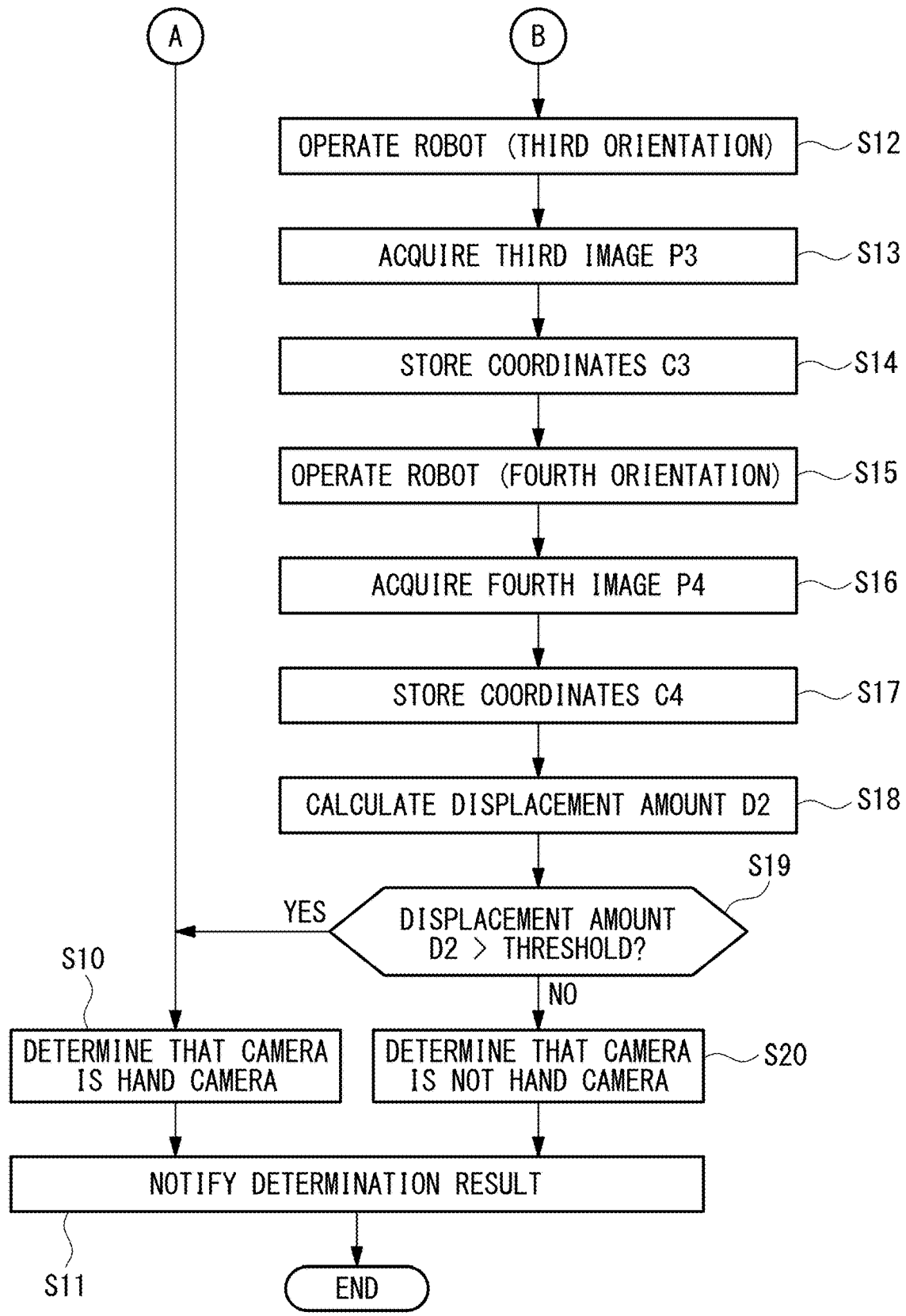
FIG. 5 is a second half of the flowchart showing the method of controlling the robot system in FIG. 1.

In the diagnosis method according to this embodiment, as shown in FIGS. 4 and 5, an operator first sets the target T at an arbitrary position within the work range of the robot 10 (step S1). Then, as a result of executing the diagnosis program, the robot control unit 31 actuates the robot 10 to be set in the first orientation as shown in FIG. 1 (step S2).

In this state, the camera control unit 32 transmits a photographing command to the camera 20 according to the diagnosis program, and causes the camera 20 to photograph the target T in the field of view to acquire a first image P1 including the target T (step S3).

Figure 6:
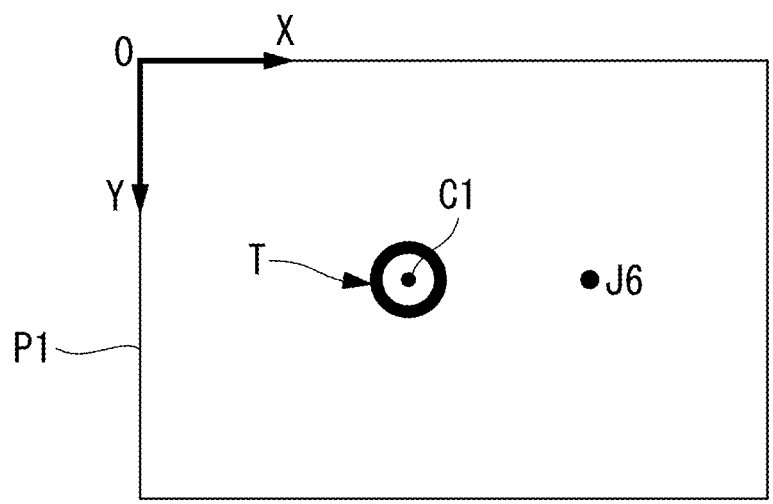
FIG. 6 is a diagram showing a first image acquired by a camera in a case in which a robot in the robot system in FIG. 1 is in a first orientation.

The first image P1 acquired by the camera 20 is transmitted to the image processing unit 33 and is processed by the image processing unit 33. By doing so, as shown in FIG. 6, the coordinates C1 of the center position of the target T in an XY coordinate system defined in the first image P1 are extracted and stored in the storage unit 34 in association with the first orientation (step S4).

Figure 7:
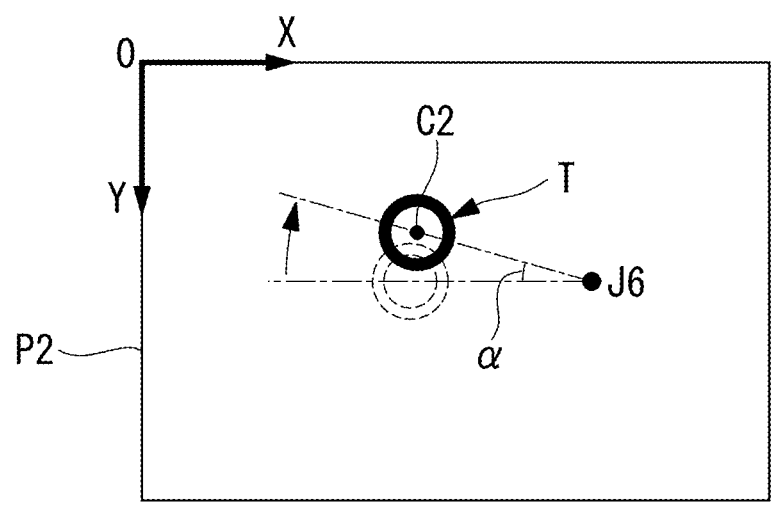
FIG. 7 is a diagram showing a second image acquired by the camera in a case in which the robot in the robot system in FIG. 1 is in a second orientation.

Subsequently, according to the diagnosis program, the robot control unit 31 causes the third wrist element 18 to rotate about the sixth axis J6 by an angle α in a counter-clockwise direction, and thus, the robot 10 is set in the second orientation (step S5). By doing so, the camera 20 also rotates about the sixth axis J6 by the angle α in the counterclockwise direction; thus, as shown in FIG. 7, the target T in the field of view of the camera 20 moves about the sixth axis J6 by the angle α in a clockwise direction.

In this state, the camera control unit 32 transmits a photographing command to the camera 20, and causes the camera 20 to photograph the target T in the field of view to acquire a second image P2 including the target T (step S6). The acquired second image P2 is transmitted to the image processing unit 33 and is processed by the image processing unit 33. By doing so, the coordinates C2 of the center position of the target T in an XY coordinate system in the second image P2 are extracted and stored in the storage unit 34 in association with the second orientation (step S7).

Subsequently, the determination unit 35 reads out, from the storage unit 34, the coordinates C1 of the center position of the target T in the processed first image P1 and the coordinates C2 of the center position of the target T in the processed second image P2. Then, the determination unit 35 calculates the distance between the coordinates C1 and the coordinates C2 to calculate a displacement amount D1 of the target T between the first image P1 and the second image P2 (step S8), and compares the calculated displacement amount D1 with a prescribed threshold set in advance (step S9).

In the case in which the calculated displacement amount D1 is larger than the threshold, the determination unit 35 determines that the camera 20 has moved in accordance with the rotation of the third wrist element 18 about the sixth axis J6, and thus that the camera 20 is a hand camera fixed to the third wrist element 18 (step S10). Then, the notification unit 36 notifies an external operator or the like that the camera 20 is a hand camera (step S11). This process terminates the diagnosis program and allows a subsequent transition to the operation program.

Meanwhile, in the case in which the calculated displacement amount D1 does not exceed the threshold, the robot control unit 31 sets the robot 10 in the third orientation in which the third wrist element 18 is minutely moved in a direction intersecting the sixth axis J6 with respect to the second orientation (step S12).

In this state, in the same manner as step S3 to step S9, the camera 20 acquires, as a third image P3, an image of the target T when the robot 10 is in the third orientation (step S13). In addition, the image processing unit 33 extracts the coordinates C3 of the center position of the target T in the third image P3, and the coordinates C3 are stored in the storage unit 34 (step S14).

Subsequently, the robot control unit 31 causes only the third wrist element 18 to rotate about the sixth axis J6 with respect to the third orientation, and sets the robot 10 in the fourth orientation (step S15). In this state, the camera 20 acquires a fourth image P4 including the target T (step S16), the image processing unit 33 extracts the coordinates C4 of the center position of the target T in the fourth image P4, and the coordinates C4 are stored in the storage unit 34 (step S17).

Then, the determination unit 35 calculates a displacement amount D2 between the coordinates C3 of the center position of the target T in the third image P3 and the coordinates C4 thereof in the fourth image P4 (step S18), and compares the calculated displacement amount D2 with the threshold (step S19). As a result, in the case in which the displacement amount D2 is larger than the threshold, the determination unit 35 determines that the camera 20 is a hand camera attached to the third wrist element 18 (step S10).

Meanwhile, in the case in which the displacement amount D2 does not exceed the threshold, it is determined that the camera 20 is not a hand camera (step S20). In this case, the notification unit 36 notifies an external operator or the like that the robot 10 is in such a state that the operation program cannot be properly executed, by means of a notification method different from the case in which the camera 20 is determined to be a hand camera (step S11). Then, the diagnosis program is terminated while the execution of the operation program is prohibited.

As described above, with the robot system 1, the control device 30, the diagnosis method, and the diagnosis program according to this embodiment, it is possible to easily determine whether or not the camera 20 is a hand camera simply by comparing the images acquired when the robot 10 is in the first orientation and the second orientation.

In addition, shifting from the first orientation to the second orientation is performed simply by operating the third wrist element 18 about the sixth axis J6, and the operation may be performed at a minute angle; therefore, it is possible to avoid interference between the robot 10 and an external structure or the like.

Furthermore, in the case in which it cannot be determined that the camera 20 is a hand camera only with the images acquired when the robot 10 is in the first orientation and the second orientation, the determination as to whether the camera 20 is a hand camera is performed by employing the images acquired when the robot 10 is set in the third orientation and the fourth orientation. Thus, it is possible to determine whether or not the camera 20 is a hand camera in a more reliable manner.

Cases in which the position of the target T does not change between the respective images acquired in the first orientation and the second orientation include, besides the case in which the camera 20 is not a hand camera, a case in which the camera 20 is a hand camera but the sixth axis J6 passes through the center of the target T. In other words, even when the sixth axis J6 accidentally coincides with the center position of the target T in the first orientation of the robot 10 set by an operator, it is possible to reliably determine whether or not the camera 20 is a hand camera.

By doing so, in a state in which the camera 20 is not fixed to the third wrist element 18, it is possible to reliably prevent an operation program from being executed on the premise that the camera 20 is fixed to the third wrist element 18.

Note that, in this embodiment, the determination as to whether the camera 20 is a hand camera is performed on the basis of each of the displacement amount D1 of the target T between the first orientation and the second orientation and the displacement amount D2 of the target T between the third orientation and the fourth orientation. Alternatively, the determination as to whether the camera 20 is a hand camera may be performed on the basis of both the displacement amount D1 and the displacement amount D2.

For example, the determination unit 35 determines whether or not the camera 20 is a hand camera by employing, as a parameter, a value obtained by adding the absolute value of the displacement amount D1 and the absolute value of the displacement amount D2.

In other words, even in a case in which the displacement amount D1 and the displacement amount D2 are relatively small or in a case in which the displacement amount D1 and the displacement amount D2 are in a mutually canceling relationship, it is possible to ensure an amount that is required as a parameter to be employed in the determination as to whether the camera 20 is a hand camera.

By doing so, when the diagnosis program is executed, it is possible to reduce the operating range of the robot 10 to a smaller extent, and also to reduce the restriction in the operating direction of the robot 10, thereby achieving the reduction of a space required to execute the diagnosis program.

In addition, although a single circular mark is employed as the target T in this embodiment, alternatively, a plurality of circular marks may be employed as the target T. Also, a single, irregular-shaped mark, the orientation of which can be recognized, may be employed.

For example, in the case in which two circular marks are disposed, as the target T, inside the field of view of the camera 20 in the first orientation, at least one of the marks could have the center position at a location different from the position of the sixth axis J6.

Therefore, the case in which the target T in the first orientation accidentally coincides with the sixth axis J6 is taken into account in the diagnosis program, and thus, it is possible to omit the step of determining the displacement of the target T in the third orientation and the fourth orientation of the robot 10. By doing so, it is possible to more easily determine whether or not the camera 20 is a hand camera.

Next, a robot system 1, a control device 30, a diagnosis method, and a diagnosis program according to a second embodiment of the present disclosure will be described below.

In the robot system 1, the control device 30, the diagnosis method, and the diagnosis program according to this embodiment, parts having the same configuration as those in the robot system 1, the control device 30, the diagnosis method, and the diagnosis program according to the above-mentioned first embodiment will be assigned the same reference signs, and descriptions thereof will be omitted.

In this embodiment, the fixed position of the camera 20 is determined by sequentially changing a subject element, which is a subject for which it is to be diagnosed whether or not the camera 20 is attached thereto, from the third wrist element 18 toward the base end.

Figure 8:
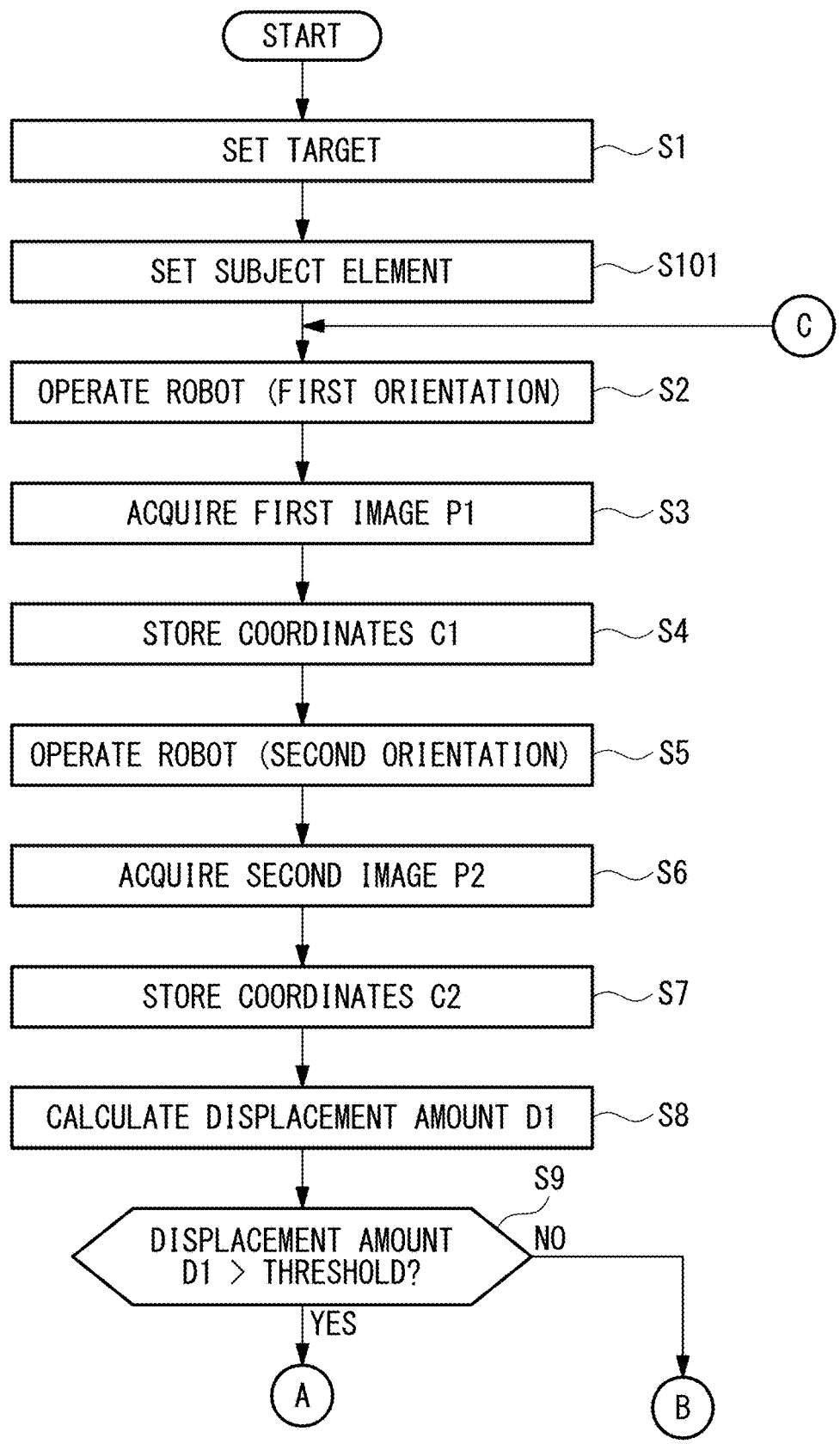
FIG. 8 is a first half of a flowchart showing a method of controlling a robot system according to a second embodiment of the present disclosure.
Figure 9:
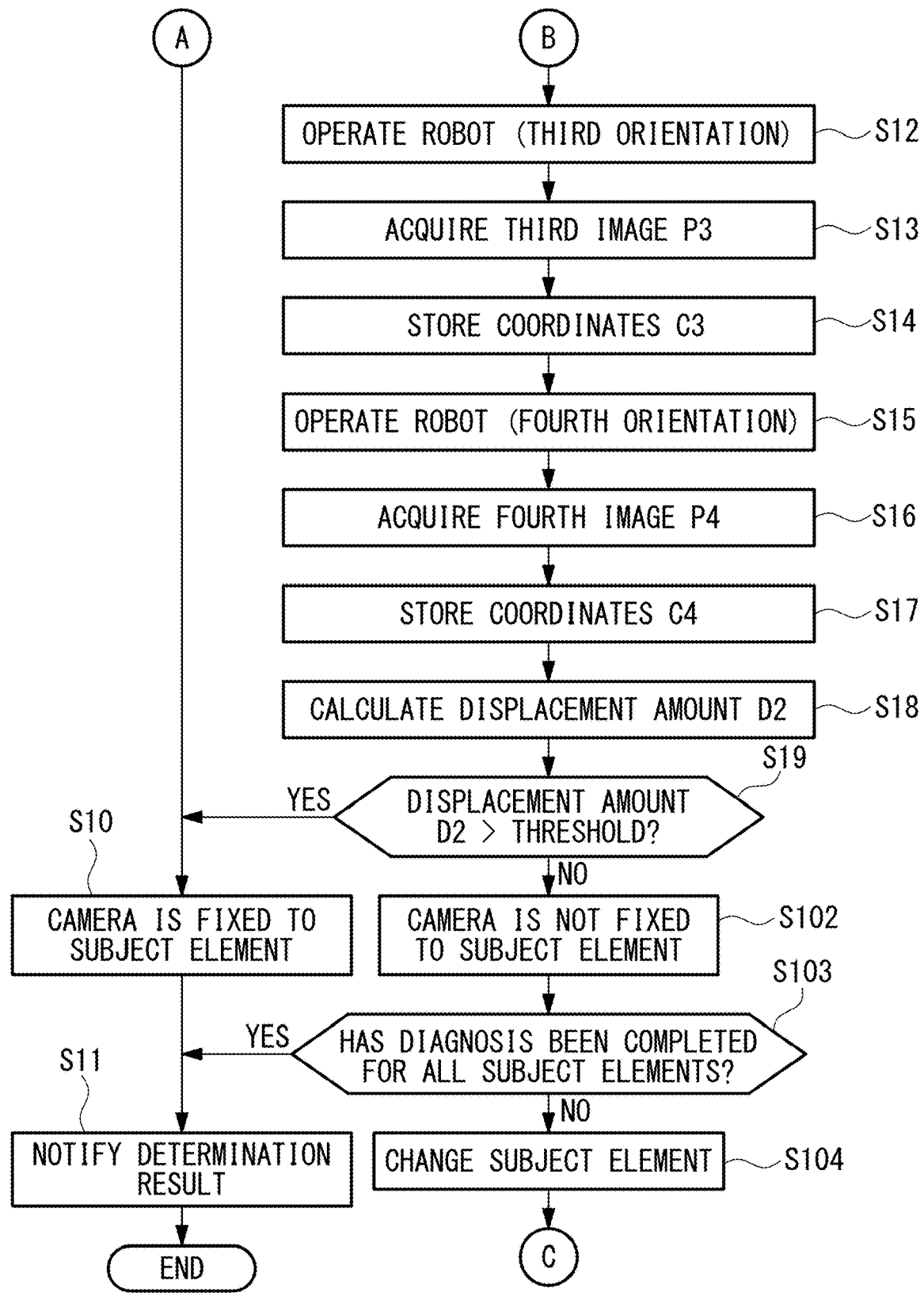
FIG. 9 is a second half of the flowchart showing the method of controlling the robot system in FIG. 8.

Specifically, in the robot system 1 according to this embodiment, as shown in FIGS. 8 and 9, the third wrist element 18 is set as the subject element in step S101, and subsequently, the processes from step S2 are executed. Then, in the case in which the displacement amount D2 is equal to or less than the threshold in step S19, it is determined in step S102 that the camera 20 is not attached to the third wrist element 18, which is the subject element.

In the case in which it is determined that the camera 20 is not attached to the subject element, it is determined in step S103 whether or not the diagnosis has been completed for all subject elements, and in the case in which the diagnosis has not been completed, the subject element is changed to the second wrist element 17, which is a wrist element closer to the base end by one component (step S104), and the processes from step S2 are repeated again. Here, in step S2 after the subject element is changed, the robot 10 is set in the same orientation as the first orientation, or in a fifth orientation in which the target T is disposed inside the field of view of the camera 20 and that is different from the first orientation. In addition, in step S5, the robot 10 is set in a sixth orientation in which the changed subject element is minutely rotated about a rotation axis of the subject element with respect to the fifth orientation. Similarly in steps S12 and S15, the robot 10 is respectively set in a seventh orientation and an eighth orientation that are different from the third orientation and the fourth orientation in the case in which the third wrist element 18 is set as the subject element.

In other words, when the subject element is changed to the second wrist element 17, the sixth orientation is an orientation in which the second wrist element 17 is minutely rotated about the fifth axis J5 with respect to the fifth orientation.

In addition, the seventh orientation is an orientation in which the second wrist element 17 of the robot 10 in the sixth orientation is moved by a minute distance in a direction intersecting the fifth axis J5, and the eighth orientation is an orientation in which only the second wrist element 17 is minutely rotated about the fifth axis J5 with respect to the seventh orientation.

By doing so, it is possible to diagnose whether or not the camera 20 is attached to the second wrist element 17.

In the case in which it is determined that the camera 20 is not attached to the second wrist element 17, it is determined whether or not the camera 20 is fixed to the first wrist element 16 closer to the base end by one component. Similarly, it is possible to determine whether or not the camera 20 is fixed to the second arm 14, the first arm 13, and the revolving drum 12.

For example, in the case in which the camera 20 is fixed to the second wrist element 17 in the robot 10 shown in FIG. 1, when the diagnosis program is executed, the subject element is first set to the third wrist element 18, and as in the first embodiment, the robot 10 is operated in the first orientation to the fourth orientation, and it is determined in step S102 that the camera 20 is not attached to the third wrist element 18, which is the subject element.

In this case, it is determined in step S103 that the diagnosis has not been completed for all subject elements; thus, in step S104, the subject element is changed to the second wrist element 17 closer to the base end by one component, and the processes from step S2 are repeated. In other words, the robot 10 is operated in the fifth orientation, which is the same orientation as the first orientation in the case in which the third wrist element 18 is set as the subject element (step S2), and a fifth image P5 is acquired (step S3). Then, the coordinates C1 of the center position of the target T in the fifth image P5 are extracted and stored (step S4).

In addition, the robot 10 is operated in the sixth orientation in which the second wrist element 17 is minutely rotated about the fifth axis J5 with respect to the fifth orientation (step S5), and a sixth image P6 is acquired (step S6). Then, the coordinates C2 of the target T in the sixth image P6 are calculated and stored (step S7). Subsequently, the displacement amount D1 is calculated (step S8), and the displacement amount D1 is compared with the threshold (step S9). In this case, the displacement amount D1 becomes larger than the threshold; thus, it is determined that the camera 20 is fixed to the second wrist element 17 which is the subject element (step S10), and the result thereof is notified (step S11).

Meanwhile, in the case in which it is determined in step S103 that the diagnosis has been completed for all subject elements, it is notified that the camera 20 is not attached to any subject element (step S11).

As described above, with the diagnosis program according to this embodiment, it is possible to identify to which wrist element or to which arm the camera 20 is fixed. Accordingly, this diagnosis program can be applied before an operation program is executed on the premise that the camera 20 is a hand camera, as well as on the premise that the camera 20 is fixed to another element, and thus, the versatility of the robot system 1 is enhanced.

The invention claimed is:

1. A robot system, comprising:
a robot with one or more movable elements that are respectively rotatable about one or more rotation axes;
a control device that controls the robot; and
a visual sensor attached to any of the movable elements of the robot, wherein the control device:
uses any of the movable elements of the robot as a subject element;
compares a position of a predetermined target in a first image acquired by the visual sensor at an arbitrary first orientation of the robot at which the target fixed at a predetermined position is disposed inside a field of view of the visual sensor, and the position of the target in a second image acquired by the visual sensor at a second orientation at which the subject element is rotated about a rotation axis of the subject element with respect to the first orientation; and
determines that the visual sensor is attached to the subject element when the position of the target in the first image and the position of the target in the second image are different.

2. The robot system according to claim 1, wherein:
the robot further comprises a robot arm and a wrist unit that is attached to a distal end of the robot arm; and
any one of the movable elements serving as the subject element is a wrist element at a tip of the wrist unit.

3. The robot system according to claim 1, wherein, when the position of the target has not changed as a result of comparing the position of the target in the first image and the position of the target in the second image,
the subject element is displaced in a direction intersecting the rotation axis of the subject element with respect to the first orientation, and the position of the target in a third image acquired in a third orientation in which the target is disposed inside the field of view of the visual sensor is compared with the position of the target in a fourth image acquired in a fourth orientation in which the subject element is rotated about the rotation axis of the subject element with respect to the third orientation, and
when the position of the target in the third image and the position of the target in the fourth image are different, it is determined that the visual sensor is attached to the subject element.

4. The robot system according to claim 3, wherein the control device determines whether or not the visual sensor is attached to the subject element on the basis of a movement amount of the target between the first image and the second image, and a movement amount of the target between the third image and the fourth image.

5. The robot system according to claim 1, wherein the control device stops an operation of the robot in a case in which it is determined that the visual sensor is not attached to the subject element.

6. The robot system according to claim 1, wherein the control device includes a notification unit that issues a notification in a case in which it is determined that the visual sensor is not attached to the subject element.

7. The robot system according to claim 1, wherein, when it is determined that the visual sensor is not attached to a movable element which is the subject element, the control device sequentially sets, as the subject element, the other movable element closer to a base end than the movable element is, in order from a distal end side, and in a case in which the position of the target in a fifth image acquired by the visual sensor in an arbitrary fifth orientation of the robot is different from the position of the target in a sixth image acquired by the visual sensor in a sixth orientation in which the subject element is rotated about the rotation axis of the subject element with respect to the fifth orientation, it is determined that the visual sensor is attached to the subject element.

8. A control device of a robot that includes one or more movable elements that are respectively rotatable about one or more rotation axes, and in which a visual sensor is attached to any of the movable elements, wherein the control device is configured to:
uses any of the movable elements of the robot as a subject element;
compare a position of a predetermined target in a first image acquired by the visual sensor at an arbitrary first orientation of the robot at which the target fixed at a predetermined position is disposed inside a field of view of the visual sensor, and the position of the target in a second image acquired by the visual sensor at a second orientation at which the subject element is rotated about a rotation axis of the subject element with respect to the first orientation; and
determine that the visual sensor is attached to the subject element when the position of the target in the first image and the position of the target in the second image are different.

9. A diagnosis method for a robot that includes one or more movable elements that are respectively rotatable about one or more rotation axes, and in which a visual sensor is attached to any of the movable elements, the diagnosis method comprising:
using any of the movable elements of the robot as a subject element;
comparing a position of a predetermined target in a first image acquired by the visual sensor at an arbitrary first orientation of the robot at which the target fixed at a predetermined position is disposed inside a field of view of the visual sensor, and the position of the target in a second image acquired by the visual sensor at a second orientation at which the subject element is rotated about a rotation axis of the subject element with respect to the first orientation; and
determining that the visual sensor is attached to the subject element when the position of the target in the first image and the position of the target in the second image are different.

10. A non-transitory computer-readable medium having a diagnosis program stored therein for diagnosing a robot that includes one or more movable elements that are respectively rotatable about one or more rotation axes, and in which a visual sensor is attached to any of the movable elements, the diagnosis program causing a computer to execute functions of:
using any of the movable elements of the robot as a subject element;
comparing a position of a predetermined target in a first image acquired by the visual sensor at an arbitrary first orientation of the robot at which the target fixed at a predetermined position is disposed inside a field of view of the visual sensor, and the position of the target in a second image acquired by the visual sensor at a second orientation at which the subject element is rotated about a rotation axis of the subject element with respect to the first orientation; and
determining that the visual sensor is attached to the subject element when the position of the target in the first image and the position of the target in the second image are different.

* * * * *